US006961721B2

(12) United States Patent
Chaudhuri et al.

(10) Patent No.: US 6,961,721 B2
(45) Date of Patent: Nov. 1, 2005

(54) DETECTING DUPLICATE RECORDS IN DATABASE

(75) Inventors: Surajit Chaudhuri, Redmond, WA (US); Venkatesh Ganti, Bellevue, WA (US); Rohit Ananthakrishna, Ithaca, NY (US)

(73) Assignee: Microsoft Corporation, Redmond, WA (US)

( * ) Notice: Subject to any disclaimer, the term of this patent is extended or adjusted under 35 U.S.C. 154(b) by 491 days.

(21) Appl. No.: 10/186,031

(22) Filed: Jun. 28, 2002

(65) Prior Publication Data

US 2004/0003005 A1 Jan. 1, 2004

(51) Int. Cl.[7] ............................ G06F 17/30; G06F 7/00
(52) U.S. Cl. ........................... 707/1; 707/100; 707/101
(58) Field of Search ...................................... 707/101, 1

(56) References Cited

U.S. PATENT DOCUMENTS 6,542,896 B1 * 4/2003 Gruenwald ................. 707/101

OTHER PUBLICATIONS

Dina Bitton and David DeWitt, Duplicate Record Elimination in Large Data Files, ACM Transactions on Database Systems. (TODS) 8(2), 1983.
Vinayak Borkar, Kaustubh Deshmukh and Sunita Sarawagi, Automatic Segmentation of Text into Structured Records, In Proceedings of ACM Sigmod Conference, Santa Barbara, CA May 2001.
A. Broder, S. Glassman, M. Manasse and G. Sweig, Syntactic Clustering of the Web, In Proc. Sixth Int'l World Wide Web Conference, World Wide Web Consortium, Cambridge, pp. 391–404, 1997.

K. Beyer, J. Goldstein, R. Ramakrishnan and U. Shaft, When is "Nearest Neighbor" Meaningful? International Conference on Database Theory, pp. 217–235, Jan. 1999.
Ricardo Baeza–Yates and Berthier Ribeiro–Neto, Modern Information Retrieval. Addison Wesley Longman, 1999.
W. Cohen, Integration of Heterogeneous Databases Without Common Domains Using Queries Based in Textual Similarity. In Proceedings of ACM SIGMOD, pp. 201–212, Seattle, WA Jun. 1998.
Ronald Forino, Data e.quality: A Behind the Scenes Perspective on Data Cleansing. http://www.dmreview.com/, Mar. 2001.
I.P. Felligi and A. B. Sunter. A Theory for Record Linkage. Journal of the American Statistical Society, 64:1183–1210, 1969.
Helena Galhardas. Data Cleaning Commercial Tools. http://caravel.inria.fr/~cleaning.html.

(Continued)

Primary Examiner—Alford Kindred
Assistant Examiner—Thanh-Ha Dang
(74) Attorney, Agent, or Firm—Microsoft Corporation

(57) ABSTRACT

The invention concerns a detection of duplicate tuples in a database. Previous domain independent detection of duplicated tuples relied on standard similarity functions (e.g., edit distance, cosine metric) between multi-attribute tuples. However, such prior art approaches result in large numbers of false positives if they are used to identify domain-specific abbreviations and conventions. In accordance with the invention a process for duplicate detection is implemented based on interpreting records from multiple dimensional tables in a data warehouse, which are associated with hierarchies specified through key—foreign key relationships in a snowflake schema. The invention exploits the extra knowledge available from the table hierarchy to develop a high quality, scalable duplicate detection process.

6 Claims, 5 Drawing Sheets

OTHER PUBLICATIONS

Helena Galhardas, Daniela Florescu, Dennis Shasha, Eric Simon and Cristian Saita. Declarative Data Cleaning: Language, Model and Algorithms. In Proceedings of the $27^{th}$ International Conference on Very Large Databases, pp. 371–380, Roma, Italy, Sep. 11–14, 2001.

Helena Galhardas, Daniela Florescu, Dennis Shasha and Eric Simon. An Extensible Framework for Data Cleaning. In ACM SIGMOD, May 1999.

L. Gravano, P. Ipeirotis, H.V. Jagadish, N. Koudas, S. Muthukrishnan and D. Srivastava. Approximate String Joins in a Database (Almost) for Free. In Proceedings of the $27^{th}$ International Conference on Very Large Databases, pp. 491–500, Roma, Italy, Sep. 11–14, 2001.

Venkatesh Ganti, Johannes Gehrke and Raghu Ramakrishnan. Cactus–Clustering Categorical Data Using Summaries. In Proceedings of the ACM SIGKDD Fifth International Conference on Knowledge Discovery in Databases, pp. 73–83, Aug. 15–18, 1999.

David Gibson, Jon Kleinberg and Prabhakar Raghavan. Clustering Categorical Data: An Approach Based on Dynamical Systems. VLDB 1998, New York City, New York, Aug. 24–27.

Sudipto Guha, Rajeev Rastogi and Kyuseok Shim, Rock: A Robust Clustering Algorithm for Catagorical Attributes. In Proceedings of the IEEE International Conference on Data Engineering, Sydney, Mar. 1999.

H. Hernandez and S. Stolfo. The merge/purge problem for large data databases. In Proceedings of the ACM SIGMOD, pp. 127–138, San Jose, California, May 1995.

J. Kivinen and H. Mannila. Approximate Dependency Inference from Relations. Theoretical Computer Science 149(1):129–149, Sep. 1995.

J. Madhavan, P. Bernstein, E. Rahm. Generic Schema Matching with Cupid. VLDB 2001, pp. 49–58, Roma, Italy.

Alvaro Monge and Charles Elkan. The Field Matching Problem: Algorithms and Applications. In Proceedings of the Second International Conference on Knowledge Discovery and Databases (KDD), 1996.

A. Monge and C. Elkan. An Efficient Domain Independent Algorithm for Detecting Approximately Duplicate Database Records. In Proceedings of the SIGMOD Workshop on Data Mining and Knowledge Discovery Tuscon, Arizona May 1997.

H. Mannila and K.–J. Raiha. Algorithms for Inferring Functional Dependencies. Data and Knowledge Engineering, 12(1):83–99, Feb. 1994.

Felix Naumann and Claudia Rolker. Do Metadata Models Meet IQ Requirements? In Proceedings of the Internaitonal Conference on Data Quality (IQ), MIT, Cambridge, 1999.

MIT Total Data Quality Management Program. Information quality. http://web.mit.edu/tdqm/www/iqc.

Erhard Rahm and H. Hai Do. Data Cleaning: Problems and Current Approaches. IEEE Data Engineering Bulletin, 23(4):3–13, Dec. 2000.

Vijayshankar Raman and Joe Hellerstein. Potter's Wheel: An Interactive Data Cleaning System. VLDB 2001, pp. 381–390, Roma, Italy.

* cited by examiner

VIEW DEFINITIONS

$L_m$ = SELECT * FROM $R_m, \ldots, R_1$ $L_i$ = SELECT $L_{i+1}.A_m, \ldots,$ (CASE WHEN $T_{i+1}.A_{i+1}$ NULL THEN $L_{i+1}.A_{i+1}$ ELSE $T_{i+1}.A_{i+1}$ ), $L_{i+1}.A_i, \ldots L_{i+1}.A_1$ FROM $L_{i+1}$ LEFT OUTER JOIN $T_{i+1}$ ON $L_{i+1}.A_m = T_{i+1}.A_m, \ldots, L_{i+1}.A_{i+1} = T_{i+1}.A_{i+1}$

---

$Q1 =$

SELECT $L_i.A_m, \ldots, L_i.A_{i+1}, L_i.A_{i-1}$, COUNT(*)

FROM (SELECT DISTINCT $L_i.A_m, \ldots, L_i.A_{i-1}$ )

GROUP BY $L_i.A_m, L_i.A_{i+1}, L_i.A_{i-1}$

HAVING COUNT(*) > 1

ORDER BY $L_i.A_m, \ldots, L_i.A_{i+1}, L_i.A_{i-1}$

---

$Q2 =$

SELECT $L_i.A_m, \ldots, L_i.A_{i+1}, L_i.A_i, L_i.A_{i-1}$

FROM (SELECT DISTINCT $L_i.A_m, \ldots, L_i.A_{i-1}$ )

ORDER BY $L_i.A_m, \ldots, L_i.A_i, L_i.A_{i-1}$

Fig.3

DETECTING DUPLICATE RECORDS IN DATABASE

FIELD OF THE INVENTION

The present invention exploits dimensional hierarchies in databases and develops a sealable, and efficient algorithm for detecting possible duplicate record values.

BACKGROUND ART

Decision support analysis on data warehouses influences important business decisions so that accuracy of data in the warehouses is very important. A significant amount of time and money are spent on data cleaning, the task of detecting and correcting errors in data.

The problem of detecting and elimination duplicated is one of the major problems in the broad area of data cleaning and data quality. It is often the case that the same logical real world entity may have multiple representations in the data warehouse. For example, when a customer named Lisa buys purchases products from Circuit City twice, her name might appear as two different records: [Lisa Simpson, Seattle, Wash., USA, 98025] and [Lisa Simson, Seattle, Wash., United States, 98025]. The discrepancy is due to data entry errors and/or preferences of the salesperson who enters the data. Such duplicated information can significantly increase direct mailing costs because several customers like Lisa may receive multiple catalogs. In direct mailing campaigns with tight budget constraints such errors can be the difference between success and failure of the campaign. Moreover, such errors can cause incorrect results in analysis queries (How many Circuit City customers are there in Seattle?) as well as erroneous analysis models to be built.

The process of detecting and eliminating multiple distinct records representing the same real world entity is a fuzzy duplicate elimination problem. The modifier fuzzy is used since the records are not exact matches. This is in contrast to several other terms—merge/purge, dedup, record linkage. This problem is different from the standard duplicate elimination problem for answering "select distinct" queries, in relational database systems which consider two tuples to be duplicates if they match exactly on all attributes. In the following discussion the term fuzzy is dropped for clarity in expression.

Duplicate elimination is a difficult problem because it is caused by several types of errors. These errors include typographical errors, and equivalence errors—different (non-unique and non-standard) representations of the same logical value. For instance, a user's preferences may dictate whether he or she enters "WA, United States" or "Wash., USA" or "WA, United States of America." Equivalence errors in product tables ("winxp" for "windows XP Professional") are different from those in bibliographic tables ("VLDB" for "very large databases"), etc. The number of duplicate tuples due to equivalence errors can be high because an equivalence error may result in several duplicate tuples.

The prior art has addressed the class of equivalence errors by building sets of rules. For instance, there are commercially available cleaning software packages that use such rules to detect errors. Previous domain-independent methods for duplicate elimination rely on threshold-based textual similarity functions (e.g., edit distance or cosine metric), which predict that two tuples whose similarity is greater than a pre-specified threshold are duplicates. However, using these functions to detect duplicates due to equivalence errors (say, "US" and "United States") requires that the threshold be dropped low enough, resulting in a large number of false positives—pairs of tuples incorrectly detected to be duplicates. For instance, tuple pairs with values "USSR" and "United States" in the country attribute are also likely to be declared duplicates if the software detects "US" and "United States" as duplicates using textual similarity.

Several earlier proposals exist for the problem of duplicate elimination. See I. P. Felligi and A. B. Sunter. A theory for record linkage. Journal of the American Statistical Society, 64:1183–1210, 1969. B. Kilss and W. Alvey. Record linkage techniques—1985. Statistics of income division. Internal revenue service publication, 1985. M. Hernandez and S. Stolfo. The merge/purge problem for large databases. In Proceedings of the ACM SIGMOD, pages 127–138, San Jose, Calif., May 1995. Alvaro Monge and Charles Elkan. The field matching problem: Algorithms and applications. In Proceedings of the second international conference on knowledge discovery and databases (KDD), 1996. A. Monge and C. Elkan. An efficient domain independent algorithm for detecting approximately duplicate database records. In Proceedings of the SIGMOD Workshop on Data Mining and Knowledge Discovery, Tucson, Ariz., May 1997. W. Cohen. Integration of heterogeneous databases without common domains using queries based in textual similarity. In Proceedings of ACM SIGMOD, pages 201–212, Seattle, Wash., June 1998.

As mentioned above, these methods rely on threshold-based textual similarity functions to detect duplicates, and hence do not detect equivalence errors unless the thresholds are sufficiently lowered; lower thresholds result in an explosion of the number of false positives. The record linkage literature also focuses on automatically determining appropriate thresholds, but still suffers from the false positive explosion. Gravano et al. proposed an algorithm for approximate string joins between relations, which in principle can be adapted to detect duplicate records. Since they use edit distance function to measure closeness between tuples, their technique suffers from the drawbacks of strategies relying only on textual similarity functions.

Most work on data cleaning can be classified into three categories. The first category views the process of cleaning a database as a transformational operation using a set of rules and related domain specific information. The second category consists of domain specific standardization and auditing techniques mostly driven by immediate requirements in the industry. A survey of all available commercial tools is available from Helena Galhardas. Data cleaning commercial tools. http://caravel.inria.fr/~galharda/cleaning.html. The third category of work focuses on preventing errors from entering the database. Borkar et al. address the problem of minimizing errors in databases due to formatting mistakes and inconsistencies (e.g., the country name appears in the zip code attribute). The important issue of designing and deploying "good" business practices and process flows to prevent problems of deteriorating data quality has been receiving attention as well. Automatic detection of integrity constraints (functional dependencies and key—foreign key relationships) so that they can be enforced in future also has a similar goal. Cleaning operations on existing erroneous databases complement these approaches, which prevent data quality from deteriorating.

SUMMARY OF THE INVENTION

Most dimensional tables in data warehouses that store large amounts of data are associated with dimensional hierarchies (e.g., organized in a snowflake schema). This is commonly done by means of key-foreign key relationships. An exemplary system exploits dimensional hierarchies to develop an efficient, scalable, duplicate data identification process which significantly reduces the number of false positives while detecting a high percentage of duplicates. The exemplary process allows detection of equivalent data in each relation or table within the hierarchies of relations.

An exemplary embodiment is implemented by a top-down traversal of the dimensional hierarchy in conjunction with textual and co-occurrence similarity for duplicate detection. The exemplary process considers two entities to be duplicates if the respective pairs of tuples in each relation or level are duplicates.

In accordance with the exemplary embodiment possible duplicates are detected in a database having records stored on a medium. The possible duplicate data records are stored in one or more tables that include multiple fields. Two or more records are identified within a table as possible duplicates by measuring co-occurence of data in hierarchically related fields of the table.

In accordance with an exemplary embodiment co-occurrence is determined by identifying a first set of record tokens in the table or tables that are contained within a first record field from records in the table or tables. The exemplary embodiment also identifies a second set of record tokens in the table or tables from other child record fields that are hierarchically linked to records contributing tokens to the first set of record tokens. A commonality between tokens in said first token set or commonality in the second token set is used to identify possible duplicate records.

These features and other objects, advantages and features of the invention will become better understood from the following detailed description of an exemplary embodiment of the invention which is described in conjunction with the accompanying drawings.

BRIEF DESCRIPTION OF THE DRAWINGS

FIG. 3 is a listing of views that are used in forming SQL queries used by a database management system in practicing the exemplary embodiment of the invention;

EXEMPLARY MODE FOR PRACTICING THE INVENTION

An exemplary embodiment of the invention concerns databases and more particularly relates to databases wherein it is desirable to reduce incidences of duplicate data by identifying tuples having the same fields even though the text or information in those fields is different. Exemplary databases are stored on one or more, possibly widely distributed computers that communicate by means of a network interconnection.

Computer System

Figure 1:
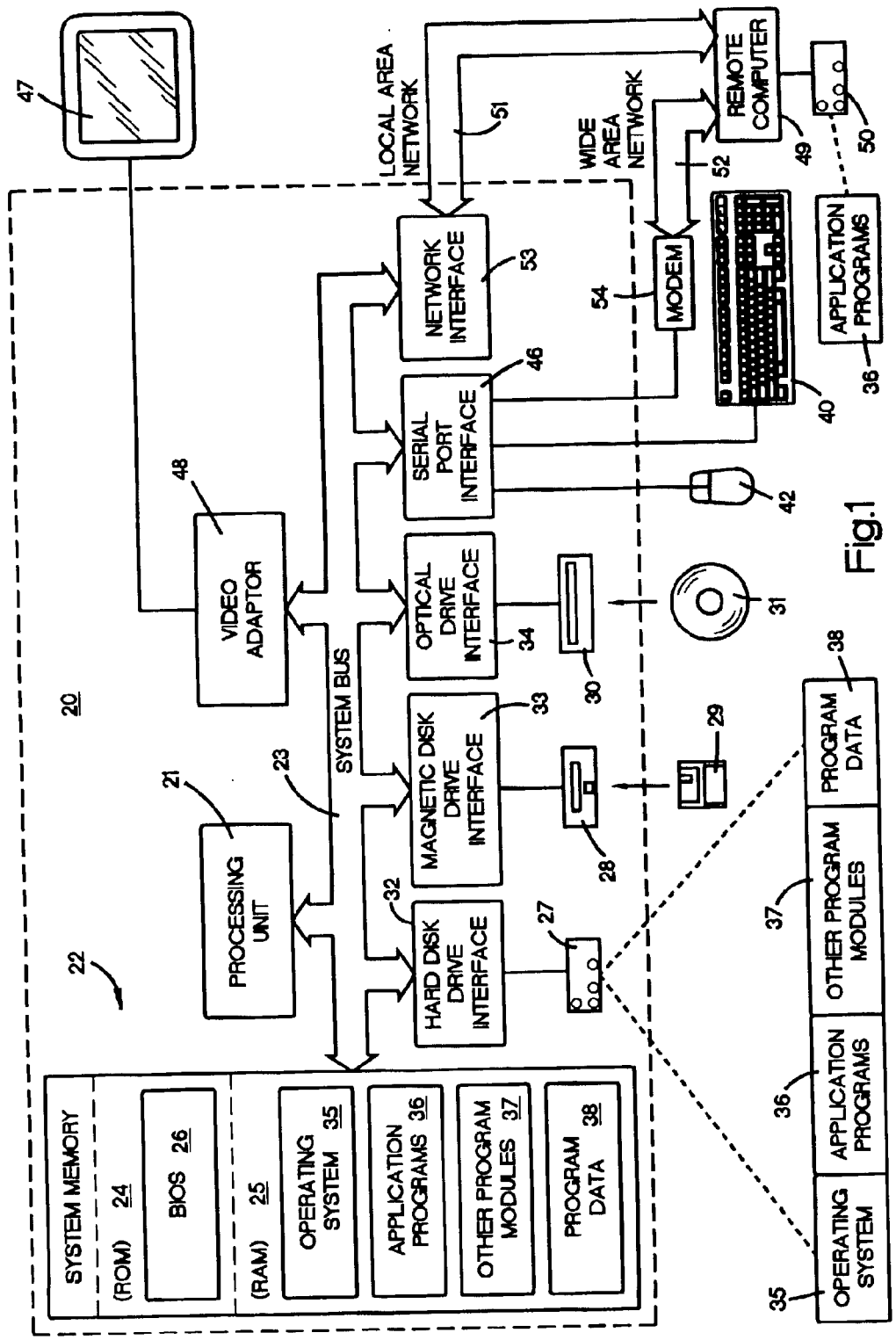
FIG. 1 is a representative computer for implementing an exemplary embodiment of the invention.

With reference to FIG. 1, an exemplary data processing system for practicing the disclosed invention includes a general purpose computing device in the form of a conventional computer 20, including one or more processing units 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system 26 (BIOS), containing the basic routines that helps to transfer information between elements within the computer 20, such as during start-up, is stored in ROM 24.

The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide nonvolatile storage of computer readable instructions, data structures, program modules and other data for the computer 20. Although the exemplary environment described herein employs a hard disk, a removable magnetic disk 29 and a removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs), read only memories (ROM), and the like, may also be used in the exemplary operating environment.

A number of program modules may be stored on the hard disk, magnetic disk 29, optical disk 31, ROM 24 or RAM 25, including an operating system 35, one or more application programs 36, other program modules 37, and program data 38. A user may enter commands and information into the computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port or a universal serial bus (USB). A monitor 47 or other type of display device is also connected to the system bus 23 via an interface, such as a video adapter 48. In addition to the monitor, personal computers typically include other peripheral output devices (not shown), such as speakers and printers.

The computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets and the Internet.

When used in a LAN networking environment, the computer 20 is connected to the local network 51 through a network interface or adapter 53. When used in a WAN networking environment, the computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the computer 20, or portions thereof, may be stored in the remote memory storage device. It will be appreciated that the network connections shown are exemplary and other means of establishing a communications link between the computers may be used.

Database Table Hierarchy

Figure 2:
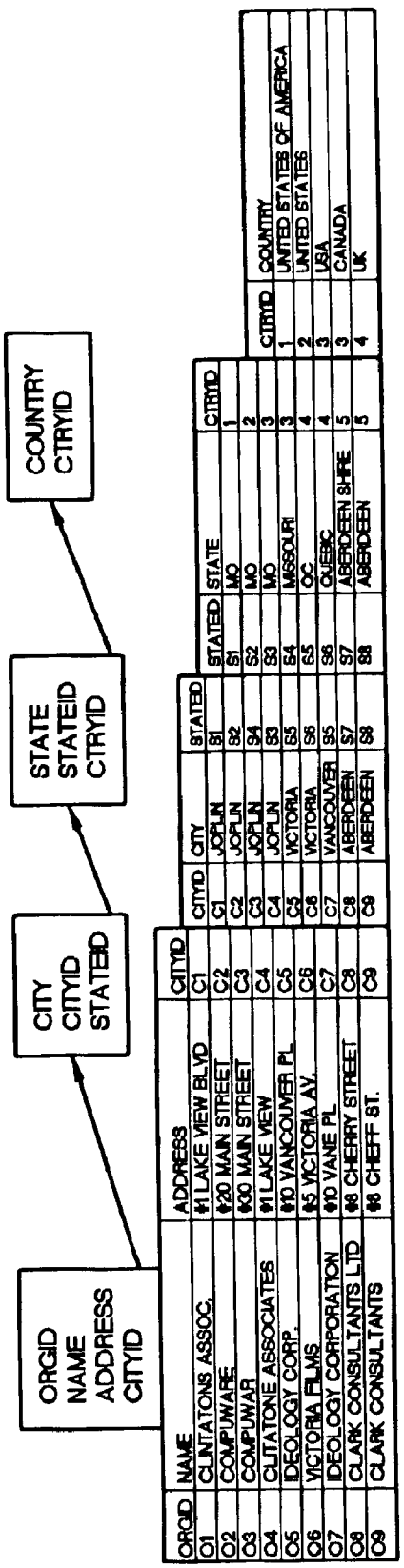
FIG. 2 is a depiction of a dimensional hierarchy for storing Customer information in a typical company selling products or services.

Turning now to FIG. 2, this figure illustrates a dimensional hierarchy for customer information saved by a typical company selling products or services that are stored on a computer or computers such as the exemplary computer of FIG. 1. FIG. 2 depicts four relations or tables designated as "Organization, City, State, and Country" relations—connected by key—foreign key relationships. The Organization relation (to the left in FIG. 2) and the Country relation (to the right in FIG. 2) are the bottom and top relations, respectively.

Consider the tuples USA and United States in the Country relation in FIG. 2. The state attribute value "MO" appears in tuples in the State relation joining with countries USA and United States, whereas most state attribute values occur only with a single Country tuple. That is, USA and United States co-occur through the state MO. In general, country tuples are associated with sets of State attribute values. And, an unusually significant overlap—called significant co-occurrence through the State relation—between two sets is a good reason for suspecting that the two countries are duplicates.

The notion of co-occurrence can also be used for reducing the number of false positives. Consider the two countries "USA" and "UK" in FIG. 2. Because they are sufficiently closer according to an edit distance function, a commonly used textual similarity function, one might (incorrectly) deduce that they are duplicates. Such problems can occur even with other textual similarity functions like the cosine metric. Using the exemplary notion of co-occurrence through the State relation, one observes that the sets—called children sets of USA and UK—of states {MO, Missouri} and {Aberdeen, Aberdeen shire} joining with USA and UK, respectively, are completely different. Hence, one concludes that USA and UK are not duplicates.

The disclosed notion of co-occurrence between tuples is similar to that used for clustering categorical data. See Venkatesh Ganti, Johannes Gehrke, and Raghu Ramakrishnan.Cactus—clustering categorical data using summaries. In Proceedings of the ACM SIGKDD fifth international conference on knowledge discovery in databases, pages 73–83, Aug. 15–18 1999. David Gibson, Jon Kleinberg, and Prabhakar Raghavan. Clustering categorical data: An approach based on dynamical systems. VLDB 1998, New York City, N.Y., August 24–27. Sudipto Guha, Rajeev Rastogi, and Kyuseok Shim. Rock: A robust clustering algorithm for categorical attributes. In Proceedings of the IEEE International Conference on Data Engineering, Sydney, March 1999. Co-occurence has also been used for matching two schema. See J Madhavan, P Bernstein, E Rahm. Generic Schema Matching with Cupid. VLDB 2001, pages 49–58, Roma, Italy.

For reasons of efficiency and scalability, an exemplary embodiment avoids comparing all pairs of tuples in each relation of the hierarchy. One prior art strategy, called the windowing strategy, sorts a relation on a key and compares all records within a sliding window on the sorted order. See M. Hernandez and S. Stolfo. The merge/purge problem for large databases. In Proceedings of the ACM SIGMOD, pages 127–138, San Jose, Calif., May 1995. However, observe that equivalence errors (e.g., UK and Great Britain) may not be adjacent to each other in standard sort orders, e.g., the lexicographical order. The exemplary embodiment exploits the dimensional hierarchy of a group of tables and uses a grouping strategy, which only compares tuples within small groups of each relation. For instance, the exemplary embodiment might only compare two State tuples if they join with the same country tuple or two country tuples that are duplicates of each other. Since such groups are often significantly smaller than the entire relation, the grouping strategy allows a comparison of all pairs of tuples in each group, and is very efficient.

Definition of Tuple Duplicates

The following discussion considers textual attributes (varchar type) for comparing tuples, and assumes default conversions from other types to text. Consider the two distinct organization entities <[Walmart], [Redmond], [WA], [USA]> and <[Walmart], [Seattle], [WA], [US]> in a Customer database with a dimensional hierarchy similar to that in FIG. 2. If one considers the Name or State, or Country relations. individually, the corresponding pairs of tuples seem to be duplicates. However, they are not duplicates on the City relation; they are in fact two distinct entities. This phenomenon is characteristic of several dimensional hierarchies. For example, publications with the same title may appear in the proceedings of a conference as well as in a journal; and, they are still two valid distinct entities in the publications database. Motivated by these examples, the exemplary embodiment considers two entities in the dimensional hierarchy to be duplicates if corresponding pairs of tuples in the relations of the hierarchy are duplicates. For example, two entities in the Organizational hierarchy in FIG. 2 are duplicates if the pairs of Country tuples, State tuples, City tuples, and Organization tuples of the two entities are duplicates.

Consider the set of relations $R_1, \ldots, R_m$ with keys $K_1, \ldots, K_m$ to constitute a dimensional hierarchy if there is a key—foreign key relationship between $R_{i-1}$ and $R_i$, ($2 \leq i \leq m$). $R_i$ is at the $i^{th}$ level relation in the hierarchy. $R_1$ and $R_m$ are the bottom and top relations, respectively, and $R_i$ is the child of $R_{i+1}$. In FIG. 1, the relations Organization, City, State, and Country constitute a dimensional hierarchy on the customer information. Let the unnormalized dimension table R be the join of $R_1, \ldots, R_m$ through the chain of key—foreign key relationships. The tuple $v_i$ in $R_i$ joins with a tuple $v_j$ in $R_j$ if there exists a tuple v in R such that the projections of v on $R_i$ and $R_j$ equal $v_i$ and $v_j$, respectively. For example, in FIG. 1, the record [S3, MO] in the State relation joins with the record [3, USA] in the Country relation. The tuple combination $[r_1, \ldots, r_m]$ is an entity if each attribute $r_i$ within a relation joins with an attribute $r_{i+1}$ in the next relation.

Duplicates: Let $f_1, \ldots, f_m$ be binary functions called duplicate detection functions where each $f_i$ takes a pair of tuples in $R_i$ along with the dimensional hierarchy, and returns 1 if they are duplicates in $R_i$, and 0 otherwise. Let $r=[r_1, \ldots, r_m]$ and $s=[s_1, \ldots, s_m]$ be embodiment concludes that r is a duplicate of s if and only if $f_i(r_i, s_i)=1$ for all i in $\{1, \ldots, m\}$. This notion can be generalized to define duplicates at the $i^{th}$ level of the hierarchy as follows. Two (sub-)entities $r^j=[r_j, \ldots, r_m]$ and $s^j=[s_j, \ldots, s_m=]$ are duplicates if and only if $f_i(r_i, s_i)=1$ for all i in $\{j, \ldots, m\}$.

For instance, the process concludes the two entities [Compuware, #20 Main Street, Jopin, Mo., United States] and [Compuwar, #20 Main Street, Joplin, Mo., USA] in FIG. 2 are duplicates only if the following pairs are duplicates: "United States" and "USA" on the Country relation, "MO" and "Missouri" in the State relation, "Jopin" and "Joplin" in the City relation, and "Compuware, #20 Main Street" and "Compuwar, #20 Main Street" in the Organization relation. Note: When using tuples in $R_i$ for comparisons, the exemplary embodiment ignores the key attributes $K_i$ and $K_{i+1}$ because they usually are artificial creations. The key attributes are only used for joining a tuple with tuples in a child relation in the hierarchy. In the following, the term "tuple" is used to mean only the descriptive attribute values—the set of attribute values not including the artificial key attributes. When this use is not clear from the context it is explicitly clarified.

Leveraging Hierarchies

The exemplary embodiment is implemented by a top-down traversal of the dimensional hierarchy in conjunction with textual and co-occurrence similarity based upon a duplicate detection function. The exemplary process uses the fact that two entities are considered to be duplicates if the respective pairs of tuples in each relation are duplicates. That is, two entities in the customer information of FIG. 2 are duplicates if and only if the Organization tuples, City tuples, State tuples, and Country tuples are all duplicates of each other.

For the example in FIG. 2, one process would examine each of the Organization, City, State, and Country relations independently to determine duplicate pairs of tuples in these relations. One may then identify pairs of duplicate entities if their corresponding tuples at each level in the hierarchy (Organization, City, State, and Country) are either equal or duplicates. The process is made efficient by exploiting the knowledge of duplicate pairs of tuples in one relation while processing another. Suppose one knows that only "United States of America" and "United States" are duplicates of "USA" and the rest are all unique tuples in the Country relation. While processing the State relation to determine duplicates, it is not required that one compare the tuples "Victoria" with "Missouri" because the former joins with Canada and the latter with (duplicates of) USA. Since Canada and USA are not duplicates of each other on the Country relation the process does not compare the "Victoria" and "Missouri" attributes.

Grouping Strategy

The exemplary process groups the State relation with the processed Country relation such that tuples which join with a country tuple v or duplicates of v are all grouped together, and only compares pairs of State tuples within each group. Generalizing the example of grouping a relation with a processed relation, the process uses the knowledge of duplicates in a combination $S_i$ ($R_{i+1}, \ldots, R_m$) of relations to group relation $R_i$ such that it places tuples $r_{i1}$ and $r_{i2}$ which join with combinations $s_{i1}$ and $s_{i2}$ from $S_i$ in the same group if $s_{i1}$ and $s_{i2}$ are equal or duplicates (i.e., corresponding pairs of tuples in $s_{i1}$ and $s_{i2}$ are equal or duplicates).

The process uses a top-down sequence of processing relations in the hierarchy because of its efficiency. After it processes the topmost relation, the child relation below is grouped into relatively smaller groups (compared to the entire relation) and compares pairs of tuples within each group. Since all pairs of tuples in a group are compared, the process detects most duplicates. As the process moves down the hierarchy, the relative difference between the (average) size of a group and the relation being processed is considerable. For instance, the Organization relation may have millions of tuples whereas the number of organizations in Seattle, Wash., USA is just in the order of thousands.

Considering the example in FIG. 2, the top-down traversal of the dimensional hierarchy is as follows. First detect duplicates in the Country relation, then process the State relation grouping it with processed Country relation, then process the City relation grouping it with the processed [State, Country] combination, and then finally process the Organization relation grouping it with the processed [City, State, Country] combination.

An important requirement of the grouping strategy is that at each level (say, i), the process identifies sets of mutually duplicate tuple combinations on ($R_i, \ldots, R_m$) such that all tuples in $R_{i-1}$ which join with any one among these tuple combinations will be grouped together. For instance, the process identifies the set {United States, United States of America, USA} of duplicates in the Country relation so that all State tuples joining with any of these three Country tuples will be placed in the same group.

Textual Similarity Functions

Prior art duplicate elimination processes have used textual similarity functions (like cosine metric and edit distance) between two entities (tuples in the unnormalized relation). If the similarity between two tuples, exceeds a pre-specified threshold, then they are considered duplicates. The exemplary embodiment uses a textual similarity function—called token containment metric—that is a variant of the cosine metric. Assuming that each tuple can be split into a bunch of tokens (say, separated by white spaces), the token containment metric between $v_1$ and $v_2$ is the fraction of $v_1$ tokens that $v_2$ contains.

Returning to FIG. 2, the process recognizes that the organization entities <[Clark Consultants, #8 Cherry St.], [Aberdeen], [Aberdeen], [UK]> (with OrgId O9) is a duplicate of <[Clark Consultants Ltd., #8 Cherry Street], [Aberdeen], [Aberdeen shire], [UK]> (with OrgId O8) because tuples at each level of the entity with OrgId O9 are similar, say according to the token containment metric, to the corresponding tuples of the entity with OrgId O8.

One sees that any sequence of processing relations in the dimensional hierarchy yields the same result when duplicate detection is based only on textual similarity.

Co-occurrence Based Functions

As mentioned above, the exemplary process bolsters duplicate detection with co-occurrence information in the hierarchy to detect equivalence errors and to reduce false positives.

In a dimensional hierarchy, the parent relation $R_i$ partitions the set of tuples in $R_{i-1}$. For instance, the Country relation divides the State relation into disjoint groups, which in turn partitions the City relation, etc. Even though this partitioning is truly of the artificial key attribute (e.g., the State relation partitions the CityId attribute of the City relation), the parent relation in most cases divides the descriptive attributes into (possibly overlapping) groups. A parent relation may not induce a true partitioning on the descriptive attributes of a child relation because certain descriptive attribute combinations may be present in multiple groups of a partition. For example, two states may have cities with the same name. Both Wisconsin and Washington have cities named Madison. However, the amount of overlap between groups associated with parent tuples provides crucial similarity information on parents.

Two tuples $v_1$ and $v_2$ $_{in\ Ri}$ co-occur through $R_j$ if they join with a tuple in $R_j$ (j>i) beneath $R_i$ in the hierarchy. In general, two distinct tuples $v_1$ and $v_2$ in $R_i$ (a higher level relation) join with two sets $S_1$ and $S_2$ (usually with little overlap) of tuples in $R_{i-1}$ (a next lower level relation). And an unusually significant overlap (more than the average overlap between pairs of tuples in $R_i$) between $S_1$ and $S_2$, respectively, is a cause for suspecting that $v_1$ and $v_2$ (of the higher level) are duplicates. Refer to $S_1$ the children set $CS(v_1)$ of $v_1$, and refer to $S_2$ the children set $CS(v_2)$ of v2. Observe that in FIG. 2 both MO and Missouri co-occur with the city "Joplin" whereas other distinct states do not co-occur with any common cities. Therefore, MO and Missouri co-occur significantly compared to other pairs, and may be considered duplicates. Informally, the co-occurrence measure—called the foreign key containment metric—between two tuples $v_1$ and $v_2$ is a measure of the fraction of the children set $CS(v_1)$ of $v_1$ contained in the children set $CS(v_2)$ of $v_2$. Note that this metric is asymmetric.

Measuring Co-occurrence

While quantifying the co-occurrence between two tuples in $R_i$, the process only uses $R_{i-1}$ and disregards information from relations further below for two reasons. First, the restriction improves efficiency because the number of distinct combinations joining with a tuple in $R_i$ increases as one goes further down the hierarchy. For example, the number of state tuples pointing to "United States" in the Country relation is less than the number of [city, state] tuple pairs that point to it. Therefore, the restriction enables efficient computation of our foreign key containment co-occurrence measure between tuples. Second, the co-occurrence information between tuples in $R_i$ provided by relations $R_j$ (j<i-1) is usually already available from $R_{i-1}$.

Top-down Traversal and Co-occurrence Measures

When one considers co-occurrence based duplicate detection functions $f_i$ on relation $R_i$, one would ideally want the relation $R_{i-1}$ to be free of duplicates. Otherwise, the function may miss some duplicates in $R_i$ when the significant fractions of children sets themselves are duplicates. For example, consider two duplicate Country tuples X and Y with children sets CS(X)={Missour, Missouri, MI, WI} and CS(Y)={CA, Missouri, MO, MN, MT, NM, NY, WA, WI}, respectively. On its face this appears to be a duplicate country. If one recognizes that Missour and Missouri are duplicates in the children set of X, then the fraction of states of CS(X) overlapping with CS(Y) increases from 0.5 to 0.75. This significant increase might make the co-occurrence significant relative to the average thus allowing the function to detect that X is a duplicate of Y.

Processing $R_{i-1}$ (the lower relation) before $R_i$ requires its child $R_{i-2}$ to be processed, and so on. Therefore, for co-occurrence based duplicate detection the functions must process relations bottom-up if it is not to miss duplicates.

Bottom-up sequence of processing of relations has the following drawbacks. Comparing all pairs of tuples in a relation at the lower levels of a dimensional hierarchy, which are potentially very large, is very inefficient. For example, the Organization relation in a typical enterprise database has millions of tuples. One might adopt the windowing strategy to compare pairs of tuples close to each other when the relation is ordered according to some attribute. However, equivalence errors may not be close to each other in such sorted orders. For example, tuples in the State relation "Missouri" and "MO" are likely to have man tuples between them in the sorted order. For this reason the exemplary process adopts the top-down sequence of processing relations. The exemplary embodiment, however, can be adapted to prevent the top-down strategy from missing duplicates due to duplicates in children sets. This procedure may involve handling duplicates at three hierarchical levels and percolating the results back to the top level.

Notation

Now define measures of textual and co-occurrence similarity.

Token Set: Given a string s, let Tok(s) denote the set of all tokens in s according to a user-specified tokenization function Tok. Let $v^i_1 = [y_1, \ldots, y_k]$ be a tuple. Define the token set $TS(v^i_1)$ to be the union $Tok(y_1) \cup \ldots \cup Tok(y_k)$ of tokens in each value $y_j$. For example, TS(["MO", "United States of America"]) is {MO, United, States, of, America}. The bag of tokens $B_t(X)$ of X is the multi-set of tokens from the union of all token sets of tuples in X. Given any two tokens $t_1$ and $t_2$, the edit distance between $t_1$ and $t_2$ is the ratio between the number of edit operations (delete, insert, transpose, and replace) required to translate $t_1$ to $t_2$ and the sum of their lengths.

Children Set: Call the projection on $R_{i-1}$ of the foreign key join between $R_{i-1}$ and $R_i$ through $K_i$ where $R_i = v^i_1$ the children set and denote it by $CS(v^i_1)$. For instance, the children set of the tuple [C1, Joplin] in the City relation is the set {[O1; Clintstone Assoc.; #1 Lakeview Blvd.]}. The bag of children $B_c(G)$ of X is the multi-set of tuples from the union of all children sets of tuples in X. One also refers to $v^i_1$ as the parent for any tuple in $CS(v^i_1)$. And, any tuple in $CS(v^i_1)$ the child of $v^i_1$.

Now define token and FK-containment metrics. Similar metrics have been used for measuring document similarities [BGM+97, BYRN99]. First, define IDF values of tuples.

Frequencies and IDF Values

Let $G = \{v_1, \ldots, v_n\}$ be a set of tuples from $R_i$. Without loss of generality, assume that j is the tuple identifier of the tuple $v_j$. Let $B_t(G)$ be the bag of all tokens that occur in any tuple in G. If the current level i>1, let $B_c(G)$ be the bag of children tuples in $R_{i-1}$ with some tuple in G as parents. The token frequency tf(t, G) of a token t with respect to G is the number of times t occurs in $B_t(G)$, and the child frequency cf(c, G) of a child tuple c with respect to G is the number of times c occurs in $B_c(G)$.

A very frequent token (or a child tuple) in $B_t(G)$ ($B_c(G)$) carries little distinguishing information compared to a rarer token. Hence, two tuples are more similar if they share an infrequent token "Timbuktoo" than if they share a very frequent token "limited." This concept is quantified by IDF values defined below.

$$IDF_t(x, G) = \frac{1}{\log\left(\frac{|G|}{tf(x,G)}\right)}; \quad IDF_t(X, G) = \sum_{x \in X} IDF_t(x, G)$$

$$IDF_c(c, G) = \log\left(\frac{|G|}{cf(c, G)}\right); \quad IDF_c(C, G) = \sum_{c \in C} IDF_c(c, G)$$

Containment Metrics: Define the containment metric $cm(S_1, S_2)$ with respect to a collection B(G) (where $S_1 \cup S_2 \subseteq B(G)$) between two sets $S_1$ and $S_2$ to be the ratio of the IDF value of their intersection $S_1 \cap S_2$ to the IDF value of the first set $S_1$. Let G be a set of tuples in $R_i$.

The token containment metric $tcm(v^i_1, v^i_2)$ with respect to G between two tuples $v^i_1$ and $v^i_2$ in $R_i$ is given by the containment metric with respect to $B_t(G)$ between their token sets. For example, if one assumes that all tokens have equal IDF values then tcm(["MO", "United States"], ["MO", "United States of America"]) is 1.0; And, tcm (["MO", "United States of America"], ["MO", "United States"]) is 0.6.

The FK-containment (foreign key) metric $fkcm_{(i-1)}(v^i_1, v^i_2)$ with respect to G between $v^i_1$ and $v^i_2$ in $R_i$ is the containment metric with respect to $B_c(G)$ between the children sets $CS(v^i_1)$ and $CS(v^i_2)$. For example, in the State relation of FIG. 1 the FK-containment metric between values "MO" (whose State.Id is S3) and "Missouri" (whose State.Id is S4) is 1.0 because their children sets are identical ({Joplin}).

The Exemplary Process

The exemplary embodiment adopts a top-down traversal of the hierarchy processing a relation $R_i$ before processing its child $R_{i-1}$. It groups each $R_i$ with the combination $S_i = \{R_{i+1}, \ldots, R_m\}$, and processes each group in $R_i$ independently. Therefore, our goals are: (i) to efficiently process each group, and (ii) to efficiently group each $R_i$ with respect to $S_i$.

While processing a group G of tuples in $R_i$, the process further reduces the number of pair wise comparisons between tuples by first identifying the set G' of all potentially duplicate tuples, and then comparing pairs of tuples only involving tuples in G'. The intuition behind the filtering strategy is that the containment metric (either TCM or FKCM) between any tuple v and v' is less than that between v and G–{v}. Therefore, any tuple v for which the containment metric between v and G–{v} is less than the specified threshold is not a duplicate of any other v' in G. The process only performs |G| comparisons to identify G', which one expects to be much smaller than G. Later, a technique is described to compute the containment metrics between v and G–{v} as efficiently as computing metrics between two tuples. Therefore, comparing pairs of tuples using the filtered set is significantly more efficient than comparing all pairs of tuples in G.

While grouping a relation $R_i$ by a combination $S_i$ of processed relations, all tuples in $R_i$ which join with tuple combinations (or sub-entities) in $S_i$ that are duplicates of each other have to be placed in the same group. A straightforward ordering of the join of $R_i$ and $S_i$ by $S_i$ does not work because duplicate tuple combinations in $S_i$ may not be adjacent to each other in the sorted order. For example, duplicates UK and Great Britain on the Country relation are unlikely to be adjacent to each other in the sorted order. The exemplary embodiment considers a new unnormalized relation $L_i$ where sets of mutually duplicate tuples in processed relations are replaced by their canonical tuples—possible correct versions of duplicates. The process then groups $L_i$ by the canonical tuple combinations in $S_i$. Since the process expresses this grouping operation using SQL queries, it exploits the underlying database system to efficiently process these queries. To avoid explicit creation of relations $L_i$ which are as large as the original database, the process relies on the concept of translation tables which only maintain a record of duplicate tuples detected. Informally, the translation table $T_i$ records the mapping between duplicate tuples in $R_i$ and tuples—called canonical tuples—representing their correct versions. For example, if USA is the canonical tuple of the set of duplicates {United States, United States of America, USA}, the translation table maps United States and United States of America to USA. The details of the actual SQL queries are described in FIG. 3.

Note: The exemplary embodiment uses the FK-containment metric only when the current relation (say, $R_i$) is not the lowest in the hierarchy. When it is the lowest relation there are no children tuples to group and evaluate.

Groupwise Duplicate Detection

The exemplary duplicate detection function uses both textual and co-occurrence similarities between tuples. The exemplary embodiment uses threshold-based decision functions to predict that two tuples are duplicates if their token containment metric is greater than a threshold called the TCM-threshold. In a separate determination the foreign key containment metric is determined and compared to a separate threshold. (FKCM-threshold). The process combines the two resulting functions to obtain a final prediction on a tuple being a duplicate of another. The intuition behind this combination function is to weight each prediction (TCM and FKCM) function with the "amount of information" it uses and to choose the prediction with the higher weight.

Each step of the exemplary embodiment is described below first assuming that the TCM and FKCM thresholds are known. A method is also disclosed that automatically determine thresholds for each group where a group G is a group of tuples being processed. The exemplary process independently predicts whether a tuple v is a duplicate of v' using TCM and FKCM based functions, and then combines using a combination function the two predictions by means of a combination function.

A) Duplicate Detection Using TCM

For clarity in presentation, first consider token containment metric for duplicate detection. Later, the FK-containment metric is added as well.

The process predicts that a tuple $v_1$ is a duplicate of another tuple $v_2$ in G if tcm($v_1$, $v_2$)>=TCM-threshold. The process uses a potential duplicate identification filter for efficiently (without pair wise comparisons) isolating a subset G' consisting of all potential duplicates. Duplicate detection on G requires: (i) identifying the set G' of potential duplicates in G, and (ii) comparing each tuple in G' with tuples in G it may be a duplicate of.

Potential Duplicate Identification Filter

The intuition already discussed above, is captured by the following Observation, which is valid for both token containment and FK-containment metrics. The observation follows from the fact that the bag of tokens for G–{v} is a superset of that for any v' in G–{v}.

Observation 1: Let cm denote either tcm or fkcm metrics, and, v and v' be two tuples in a set of tuples G. Then, $$cm(v, v') \leq cm(v, G-\{v\})$$

Computing tcm(v, G–{v}) Using Token Tables

There is an efficient way to compute tcm(v, G–{v}) for any tuple v in G. The intuition is that the computation only requires the knowledge of whether a token in the token set TS(v) of v is also in the token set TS(G–{v}) of G–{v}. And, that all such tokens have a frequency, with respect to the bag of tokens $B_t(G)$ of G, of at least 2. Hence, tokens with frequency one are not required for comparing two tuples or tuple v with G–{v}.

The exemplary embodiment builds a structure called the token table for G containing the following information: (i) the set of tokens whose frequency tf(t, $B_t(G)$) is greater than one, (ii) the frequencies of such tokens, and (iii) the list of (pointers to) tuples in which such a token occurs. The difference between a token table and an inverted index over G is that the token table only contains tokens whose frequency with respect to G is greater than 1, and hence smaller because a large percentage of tokens usually only occur once in $B_t(G)$. The process maintains lists of tuple identifiers only for tokens that are not very frequent. The frequency at which the process starts ignoring a token—called the stop token frequency—is set to be equal to 10% of the number of tuples in G.

EXAMPLE 1

Consider one example in FIG. 2. Suppose one is processing the State relation grouped with the Country relation, and that the process detected the set {United States, United States of America, and USA} to be duplicates on the Country relation. For the group of State tuples joining with USA and its duplicates, the token table consists of one entry: {[token=MO, frequency=3, tupleId-list=<S1, S2, S3>]}.

The token table building procedure is described below. Two tokens that are very close to each other according to the edit distance function (less than 0.15, in our implementation) are treated as synonyms; and update frequencies to be the sum of their individual frequencies.

After building the token table of G, the process computes $tcm(v, G-\{v\})$ by looking it up for each token in TS(v). Any tuple v such that $tcm(v, G-\{v\})$ is greater than the TCM-threshold is a potential duplicate tuple.

Computing Pairs of Duplicates

The exemplary process compares each tuple v in G' with a set $S_v$ of tuples it is likely to be a duplicate of. For any tuple v' in $S_v$ such that tcm(v, v')>TCM-threshold, the process adds the pair (v, v') to the pairs of duplicates from G. The set $S_v$ is the union of all tuples containing tokens in common with v, and can be obtained easily from the token table.

B) Duplicate Detection Using FKCM

The process predicts that a tuple $v_1$, is a duplicate of another tuple $v_2$ in G if $fkcm(v_1, v_2)$>=FKCM-threshold. The exemplary process determines a set of potential duplicates by efficiently computing $fkcm(v, G-\{v\})$ using children tables. The computation of the set G' of potential duplicates and duplicates of tuples in G' is the same as for TCM. Hence, only the construction of the children table for a group G of tuples is described.

Children Tables

The children table of G is a hash table containing a subset of the union of children sets $B_c(G)$ of all tuples in G. It contains: (i) each child tuple c from $R_{i-1}$ joining with some tuple in G, and whose frequency $cf(c, B_c(G))$ is greater than one, (ii) the frequencies of such children tuples, and (iii) the list of (pointers to) tuples in G with which c joins.

Here also, the process only maintains lists of tuples only for children tuples that have a frequency less than the stop children frequency, also fixed at 10% of the number of tuples in G.

EXAMPLE 2

Consider the example in FIG. 2. We process the State relation grouped with the Country relation. Suppose {United States, United States of America, and USA} is a set of duplicates on the Country relation. For the group of State tuples joining with USA and its duplicates, the children table contains one entry: {[child-tuple={Joplin, frequency=3, tupleId-list=<S1, S3, S4>]}.

Note: Recall that the frequency of a child tuple in $B_c(G)$ is based only on its descriptive attribute value combinations and ignores the key attributes in $R_{i-1}$. In the above example, the tuple Joplin has a frequency 3 because we ignore the CityId attribute values.

Building the Children Table: The procedure is similar to that of building the token table except for the crucial difference which arises because the union of all children sets Bc(G) can be large, e.g., all street addresses in the city of Illinois, Chicago. Therefore, we first obtain all children of G tuples with frequency greater than 1 and add them to the hash table. At this point, we do not associate each child tuple with the tuple in G it joins with. We re-obtain tuples in G along with their children to prepare the list of G tuples associated with multi-frequency children tuples in the children table. In Section 5.2, we describe a method to obtain the multi-frequency children tuples as well as the association between multi-frequency children tuples with tuples in G.

C) Combination Function

If the current relation is the lowest in the hierarchy then the process return all pairs predicted to be duplicates by TCM as duplicates. If the TCM and FKCM metrics agree on this assessment, the combination of the two predictions are in agreement and the process identifies those pairs as duplications. Now consider a combination function to reconcile conflicting predictions, which is based on the intuition that the containment metric is as valuable as the information it uses. IDF values capture this concept. Domain-specific combination functions may also be used instead of the following exemplary method. For example, a weighted linear combination of the TCM and FKCM metrics can be used.

The exemplary process is illustrated through an example. The details are in Appendix A.2. Suppose that in FIG. 2, "UK" is considered a duplicate of "USA" and this is likely according to a textual similarity function. FKCM contradicts this prediction because they do not co-occur with any common state tuple, hence there is a conflict between the two predictions. This is because the children set of UK has a higher IDF value than its token set, our combination method predicts that UK is not a duplicate of USA. Observe that the IDF values are computable from the token and children tables of G because the IDF value of all unique tokens (unique children) which are not present in the token table (the children table) is log(|G|).

Canonical Tuples

Recall that the grouping strategy requires that $R_i$ tuples, which join with any one of a set of mutually duplicate tuple combinations in $S_i$, are placed in the same group. Therefore, the process identifies sets of mutually duplicate tuples in the group G, and then picks a canonical tuple to represent each set. The transitive closure of the duplicate pairs is computed on $R_i$ assuming that the relationship "is a duplicate of" is transitive. The process then chooses the tuple with the highest IDF (token set for $R_1$ and children set for other relations) value as the canonical tuple.

The disclosed exemplary embodiment ensures that the sets of duplicates are disjoint so that the same tuple at a lower level does not appear in multiple groups because allowing a tuple to be in multiple groups is potentially inefficient. The process places a tuple v in the set with the closest (computed using FKCM at higher levels and TCM at the lowest level) canonical tuple.

Figure 5:
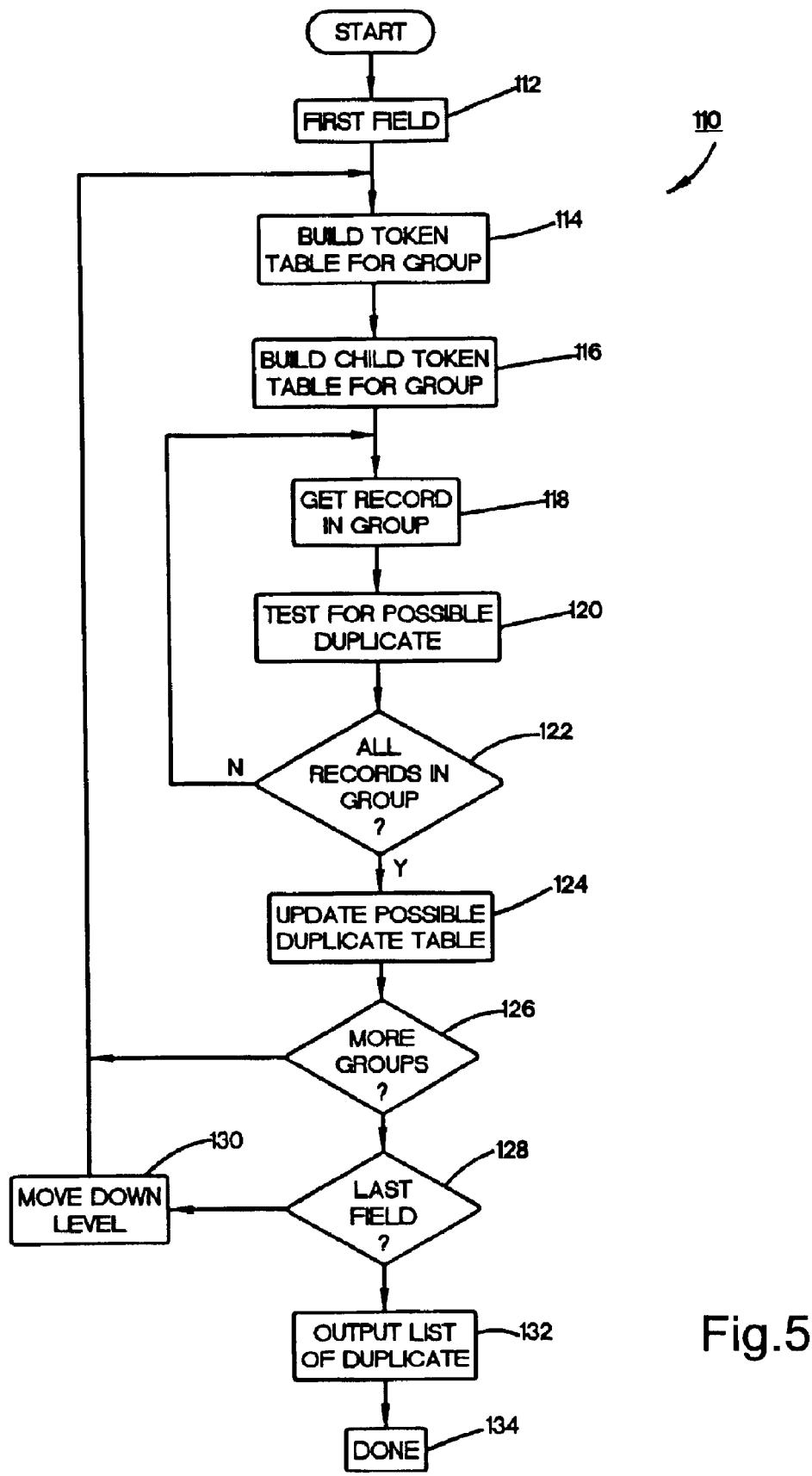
FIG. 5 is a flow chart for determining possible duplicate data records.

Top-down Traversal with Flowchart of FIG. 5

Starting from a top level relation or table, a process 110 depicted in FIG. 5 groups the records within a relation (or table of records) and invokes a groupwise duplicate detection on each group. The process starts with a highest level table such as the country relation of FIG. 2. The exemplary process works with records in a single table or with multiple linked tables each of which has records having fields that make up a subset of the records to be examined. The following discussion discusses fields of a record with the understanding that the fields may be distributed across multiple linked (by key—foreign key) tables. Also, a field in the following description may actually denote multiple fields from the same table.

Beginning at a first field 112, the process starts by building a token table 114 for the group of records under examination. The process initially has no way of grouping records in the topmost level so that initially the group is all records of the table. A child level token table is built 116 for the next level field that is linked to the field under examination. Once the token tables are built, a record in the group is accessed 118 to determine if it has a duplicate. A test is performed to determine 120 if the record under examination is a possible duplicate with another record in the group under evaluation. If it is, the record is tagged and a test 122 performed to determine if all records in the group have been examined. Once all records in the group have been examined, we group duplicate records and pick a canonical record for each group, and then update a table of possible duplicate records 124 and a test 126 performed to determine if there are other groups to be evaluated at this level. If there are additional groups the appropriate token tables are constructed and the other groups evaluated for possible duplicate records. If there are no other groups, a test is performed 128 to determine if all fields of the database records have been evaluated. If they have not, the process moves down 130 to the next level and appropriate token tables are built for the groups of that level. Once all fields have been traversed from top to bottom, the process 110 outputs a list 132 of possible duplicate records and the process is completed 134.

Translation Tables

The process summarized in FIG. 5 is implemented with a translation table $T_i$ which records duplicate tuples and their canonical tuples in $R_i$, assuming that all duplicate tuples in relations $R_{i+1}, \ldots, R_m$ have been replaced with their canonical tuples. Let Canonical_$R_i$ represent the relation $R_i$ where each duplicate tuple has been replaced with its canonical tuple. The translation table $T_i$ has the schema: [$R_i$, $R_i$ AS Canonical_$R_i$, Canonical_$R_{i+1}$, . . . , Canonical_ $R_m$]. $T_i$ records each duplicate tuple v and its canonical tuple v' along with the canonical tuple combination from the grouping set [$R_{i+1}, \ldots, R_m$] of relations.

Coordination

The exemplary process forms two SQL queries Q1 and Q2 whose results contain the information required for processing all groups in $R_i$. The process uses a sequence of views $L_m, \ldots, L_i$ (defined in FIG. 3) to form the queries Q1 and Q2. Informally, $L_j$ represents the current state of the unnormalized relation R after all duplicate tuples (in $R_{i+1}, \ldots, R_m$) are collapsed with their canonical tuples. Each $L_j$ has the same schema as the unnormalized dimension relation R, the join of $R_1, \ldots, R_m$. Let $A_i$ denote the set of descriptive attributes (not including keys) in $R_i$. For the sake of clarity, the key—foreign key join conditions in the where clause has been omitted. In the following description, the special case when $R_i$ is the lowest relation is not considered.

Both queries Q1 and Q2 order $R_i$ on S=[$L_i.A_m, \ldots, L_i.A_{i+1}$]. Let s be a combination on $G_s$ be the group of tuples in $R_i$ joining with s. We invoke the duplicate detection procedure for each group $G_s$ with groups G1 and G2 obtained from Q1 and Q2, respectively, as follows. We scan the result of Q1 for a group G1 corresponding to s, pause and scan the result of Q2 for a corresponding group G2, and then continue the process for the next group. The group G1 consists of the information required for building the children table for $G_s$, and G2 that for building the token table. Because we avoid repeated random accesses to the relations by exploiting the underlying database system to process these queries, we are efficient.

For example, if USA is the canonical tuple of the set of duplicates {United States, United States of America, USA}, the translation table maps United States and United States of America to USA. An outer join between the original unnormalized relation R and the translation table on the country attribute results in new unnormalized relation L with a canonical_Country attribute. In L, United States and United States of America are always replaced by USA; if a tuple v in the Country relation does not join with any tuple in the translation table (i.e., v is unique), L retains v as is.

Dynamic Thresholding

In many cases, it is difficult for users to set TCM and FKCM thresholds. The exemplary embodiment can automatically determine thresholds. When the fraction of duplicates in a group is small (say, around 10%), a duplicate tuple v is likely to have a higher value for containment metric (TCM or FKCM) between v and G−{v} than a unique tuple. Therefore, we expect them to be outliers in the distribution of containment metrics (for both TCM and FKCM) between v and G−{v} for each tuple in G. Observe that an important characteristic of this approach is that it allows thresholds to be determined for each group independently. When the numbers of tokens vary significantly across groups (e.g., organization names in Argentina may typically be much longer than they are in United States). In such cases, dynamic thresholding is better.

Complexity

In each iteration of the exemplary embodiment, two queries are sent to the database system where each query computes the join of relations $R_m, \ldots, R_i, R_{i-1}$. Since key—foreign key joins are very efficient, these queries can be processed efficiently, especially if appropriate indexes are created. Since the expected number of duplicates and hence the translation tables to be small, the outer joins with translation tables are also processed efficiently.

Main Memory Requirements: The group level duplicate elimination procedure requires for each group G, the token table, the children table, and the tuples in G to be in main memory. If the frequency distribution of children or tokens follows the Zipfian distribution [Zipf], then less than half the tokens or children have frequencies greater than 1, and will actually be maintained in memory. Hence, Delphi's main memory requirements are not significant.

FKCM Measurement

Recall that the FKCM metric only uses co-occurrence information from one level below. Such a strategy is very efficient and good enough for most practical cases. However, it misses out on two exceptional cases, which we now discuss.

Small children sets: When the children set of a tuple $v_1$ is so small that even a single erroneous tuple in CS($v_1$) is a significant fraction, we may incorrectly believe that $v_1$ is unique when in fact it is a duplicate of $v_2$. If it is desirable to detect such errors, the process can be modified so that the children table building and processing as follows. First add all children tuples in $B_c$(G) (even those with frequency 1) to the children table. Compare (using TCM) whether two tuples in the children table are duplicates. If so, treat them as synonyms when measuring the FK-containment metrics between their parents.

Correlated Errors:

Consider the tuple ("United States", "Washington", ) that is a duplicate of ("USA", "WA", ) where ** represents the same set of values in both tuples. In such cases, we may not detect that "United States" is a duplicate of USA through co-occurrence unless we look one level below the States relation. The exemplary process can be adapted to measure co-occurrence through lower level relations as well. Such an adaptation adds significant computational overhead. In fact, it is possible that the number of combinations is so high (e.g., consider all organizations in a country like USA) that the modified children table may not even fit in main memory.

Test on a Sample Database

Building the Token Table:

The procedure for building the token table of G is as follows: The process tokenizes tuples in G, and builds a hash table containing tokens, and their frequencies. Before removing tokens with frequency 1 from the token table, the process collapse tokens that are very close to each other according to the edit distance function. (In our implementation, we collapse two tokens if edit distance between them is less than 0.15.) Instead of comparing all pairs of tokens in $B_t(G)$, we use the windowing strategy (say, within a window of size 20). Collapsed tokens are treated as a single token; we update their frequencies to be equal to the sum of their individual frequencies. We then build lists of tuple identifiers for all tokens remaining in the token table.

Combination Function:

For any pair (v, v') in the set of potential duplicates computed using TCM or FKCM, the combination function returns the decision of TCM if the IDF value $IDF_t(TS(v))$ of the token set of v is greater than or equal to the IDF value $IDF_c(CS(v))$ of the children set of v; otherwise, it returns the decision of the FKCM.

Outlier Detection for Dynamic Thresholding:

Several outlier detection methods have been developed in the Statistics literature (e.g., see [BL94]). We adopt one commonly used method for computing these thresholds. The outlier detection method is based on the assumption that the distribution of token containment metrics fits the Normal distribution, which is valid for most high dimensional data (of which textual strings is an example) [BGRS99]. In principle, we can use a better fitting distribution [BL94]. We estimate the mean and standard deviation, from the distribution of containment metrics of all tuples in G. A tuple v for which TCM(v, G−{v}) is a few standard deviations (1.50 times for the 1-sided 90th percentile) away from the mean is an outlier. In testing of the exemplary embodiment, the TCM-threshold was set at mean+1.50* (standard deviation).

Sample Bibliographic Database

The exemplary embodiment was evaluated on an empirical evaluation on a bibliographic database with the dimensional hierarchy: ListOfAuthors, Title, Conference/Journal, and Year describing each published article: the list of authors of the article, its title, the conference or journal it appeared in, and the year it was published in. The database consists of 10000 publication entities.

The bibliography database differs from a typical Customer database in the following characteristics. Two tuples in the year relation exhibit significant co-occurrence through the conference/Journal relation because these are typically periodic publications. The attribute values in Conference/Journal, Title, and ListOfAuthors are significantly longer strings (in terms of the number of tokens) than the attributes in the Customer database. The exemplary embodiment performed very well even on the bibliographic database, thus supporting the claim that hierarchies and the co-occurrence information available in them can be exploited across several domains.

Results

The exemplary embodiment was compared with state of the art duplicate detection processes referred to as MP-Edit and MP-CM. The comparison varied the amount of error induced into the dimensional hierarchy between 15% and 40%, and fix the fractions of equivalence errors at 0.25, and spelling & truncation errors at 0.75. During testing, several combinations of threshold and window size for MP-EDIT and MP-CM were tried. Increasing the window size lead to a decrease in the number of false negatives but the number of false positives increased. Similar behaviour was observed on varying the threshold. In the results presented here the window size was 10 and threshold for MP-CM was 0.9 and for MP-EDIT 0.1

Figure 4A:
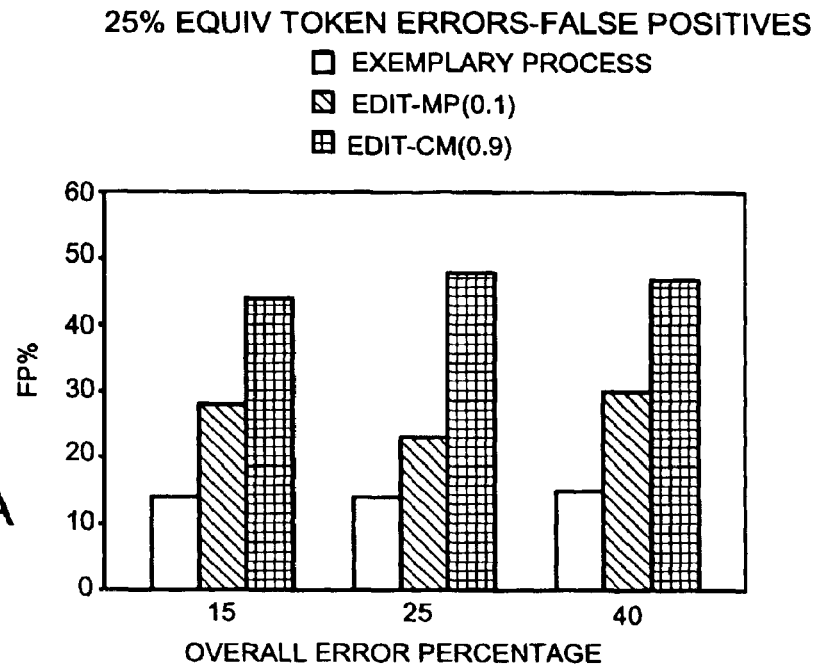
FIGS. 4A and 4B are charts showing results from practicing the exemplary embodiment and a comparison of the invention with prior art duplicate record detection.
Figure 4B:
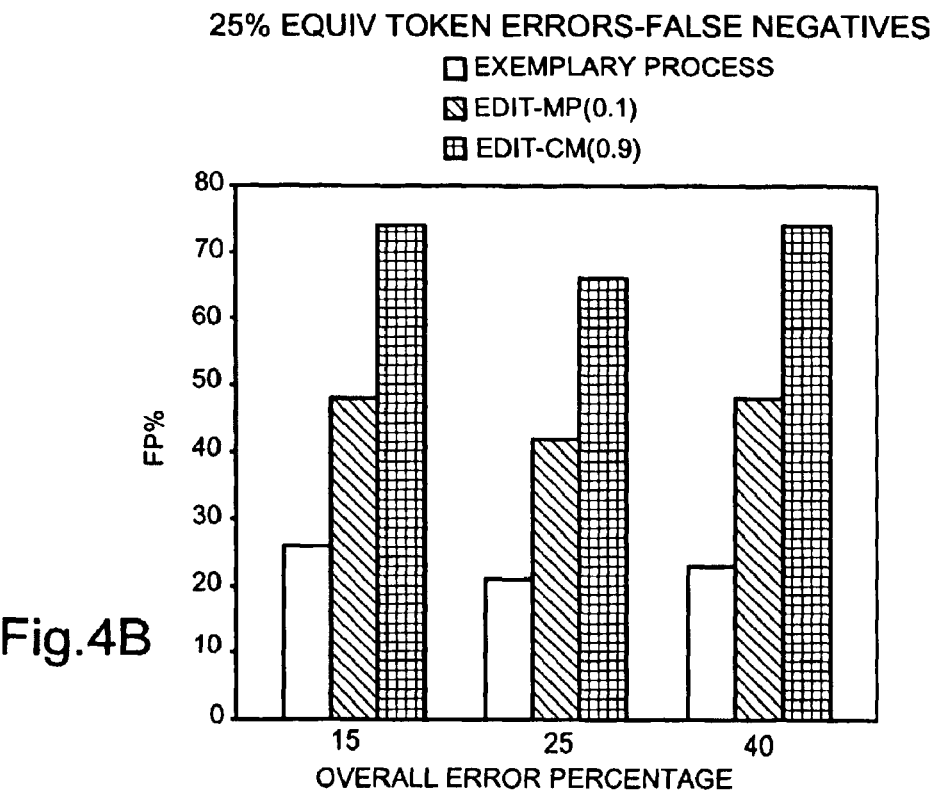

The two processes with which the exemplary embodiment is compared are designated MP-CM and MP-Edit in FIGS. 4A and 4B. These two processes are derivatives of the windowing-based MergePurge algorithm using cosine metric and edit distance, respectively. See M. Hernandez and S. Stolfo. The merge/purge problem for large databases. In Proceedings of the ACM SIGMOD, pages 127–138, San Jose, Calif., May 1995. A. Monge and C. Elkan. An efficient domain independent algorithm for detecting approximately duplicate database records. In Proceedings of the SIGMOD Workshop on Data Mining and Knowledge Discovery, Tucson, Ariz., May 1997. W. Cohen. Integration of heterogeneous databases without common domains using queries based in textual similarity. In Proceedings of ACM SIGMOD, pages 201–212, Seattle, Wash., June 1998. The exemplary embodiment that was tested used global thresholds for both the textual and co-occurrence based similarity functions.

FIGS. 4A and 4B show the false positive and false negative percentages, respectively, of the exemplary embodiment, MP-Edit (0.1), and MP-CM (0.9). The exemplary embodiment significantly outperformed both variants of these prior art MergePurge processes. Use of the invention uses the existing hierarchy of present data warehouses by means of the disclosed co-occurrence process to significantly reduce both false positives and false negatives while eliminating duplicates.

While the disclosed exemplary embodiment has been described with a degree of particularity, it is the intent that the invention not be limited to the exemplary embodiment but instead that the invention include all modifications and alterations from that embodiment contained within the spirit or scope of the appended claims.

What is claimed is:

1. In a database having records stored on a computer readable medium, a computer implemented method for identifying possible duplicate data records comprising:
 a) providing multiple records in one or more tables that include multiple fields; and
 b) identifying two or more records within a table as possible duplicates by measuring a co-occurrence of data in two or more hierarchically related fields of the table;
 wherein measuring co-occurrence is performed by:
 a) identifying a candidate set of records having a first record field from records in the table or tables; and
 b) determining a commonality between records having first record fields based on tokens in the a set of one or more child record fields related to the first record fields to identify possible duplicate records from the candidate set of records, which predicts a record $v_1$ is a possible duplicate of another record $v_2$ if a containment metric of tokens from a field of $v_1$ in the record $v_2$ is greater than or equal to a threshold value; wherein
 a) a textual similarity between tokens in said first field compared in determining a token containment metric;
 b) a textual similarity between tokens in said child record fields is compared in determining a foreign key containment metric; and
 c) both the token containment metric and the foreign key containment metric are combined in identifying possible duplicate records in the candidate set of records; and wherein a choice is made between a test of the token containment metric and test of the foreign key containment metric based on an information content of the tokens used to determine said token containment metric and foreign key containment metric.

2. In a database having records stored on a computer readable medium, a computer implemented method for identifying possible duplicate data records comprising:

a) providing multiple records in one or more tables that include multiple fields; and b) identifying two or more records within a table as possible duplicates by measuring a co-occurrence of data in two or more hierarchically related fields of the table;

wherein measuring co-occurrence is performed by:

a) identifying a candidate set of records having a first record field from records in the table or tables; and b) determining a commonality between records having first record fields based on tokens in the a set of one or more child record fields related to the first record fields to identify possible duplicate records from the candidate set of records, which predicts a record $v_1$ is a possible duplicate of another record $v_2$ if a containment metric of tokens from a field of $v_1$ in the record $v_2$ is greater than or equal to a threshold value; wherein a) a textual similarity between tokens in said first field compared in determining a token containment metric;

b) a textual similarity between tokens in said child record fields is compared in determining a foreign key containment metric; and c) both the token containment metric and the foreign key containment metric are combined in identifying possible duplicate records in the candidate set of records; and wherein a determination of a possible duplicate is made based on the token containment metric and the foreign key containment metric wherein tokens used to determine said token containment metric and foreign key containment metric are weighted according to their information content.

3. The method of claim 2 wherein tokens of linked child field are identified by grouping contents of hierarchically linked records that are possible duplicates based on a combination of containment metrics for tokens of the first field.

4. For use with a database having records stored on a computer readable medium, a machine readable medium including instructions for identifying possible duplicate data records comprising instructions for:

a) providing multiple records in one or more tables that include multiple fields; and b) identifying two or more records within a table as possible duplicates by measuring a co-occurrence of data in two or more hierarchically related fields of the table;

wherein measuring co-occurrence is performed by:

a) identifying a candidate set of records having a first record field from records in the table or tables; and b) determining a commonality between child record fields related to the first record field based on tokens in a set of one or more child record fields to identify possible duplicate records from the candidate set of records;

wherein the instructions predict a record $v_1$ is a possible duplicate of another record $v_2$ if a containment metric of tokens from a field of $v_1$ in the record $v_2$ is greater than or equal to a threshold value;

wherein a) a textual similarity between tokens in said first field is compared in determining a token containment metric;

b) a textual similarity between tokens in said child record fields is compared in determining a foreign key containment metric; and c) both the token containment metric and the foreign key containment metric are combined in identifying possible duplicate records in the candidate set of records; and wherein a choice is made between a test of the token containment metric and a test of the foreign key containment metric based on an information content of the tokens use to determine said token containment metric and foreign key containment metric.

5. For use with a database having records stored on a computer readable medium, a machine readable medium including instructions for identifying possible duplicate data records comprising instructions for:

a) providing multiple records in one or more tables that include multiple fields; and b) identifying two or more records within a table as possible duplicates by measuring a co-occurrence of data in two or more hierarchically related fields of the table;

wherein measuring co-occurrence is performed by:

a) identifying a candidate set of records having a first record field from records in the table or tables; and b) determining a commonality between child record fields related to the first record field based on tokens in a set of one or more child record fields to identify possible duplicate records from the candidate set of records;

wherein the instructions predict a record $v_1$ is a possible duplicate of another record $v_2$ if a containment metric of tokens from a field of $v_1$ in the record $v_2$ is greater than or equal to a threshold value;

wherein a) a textual similarity between tokens in said first field is compared in determining a token containment metric;

b) a textual similarity between tokens in said child record fields is compared in determining a foreign key containment metric; and c) both the token containment metric and the foreign key containment metric are combined in identifying possible duplicate records in the candidate set of records; and wherein a determination of a possible duplicate is made based on the token containment metric and the foreign key containment metric wherein tokens used to determine said token containment metric and foreign key containment metric are weighted according to their information content.

6. The medium of claim 5 wherein tokens of linked child field are identified by grouping contents of hierarchically linked records that are possible duplicates based on a combination of containment metrics for tokens of the first field.

* * * * *